United States Patent [19]
Durante

[11] 3,727,312
[45] Apr. 17, 1973

[54] DENTAL HAND INSTRUMENT
[76] Inventor: Joseph L. Durante, 651 Main Street, N. Hackensack, N.J. 07601
[22] Filed: Mar. 15, 1971
[21] Appl. No.: 124,210

[52] U.S. Cl..................................................32/27
[51] Int. Cl..............................................A61c 1/10
[58] Field of Search..........................32/27, 26, 28

[56] References Cited
UNITED STATES PATENTS
1,688,136  10/1928  Chayes et al. ..................32/27 X Primary Examiner—Robert Peshock
Attorney—Salvatore C. Mitri

[57] ABSTRACT

An improved dental hand instrument is provided having means whereby the head of the instrument can be rotated relative to the body thereof so that a dental work piece projecting from the head can be displaced through an arc and positioned at various angles with respect to the body. In a preferred embodiment, the dental hand instrument is provided with an improved and simplified drive means whereby the number of working parts required to drive a dental work piece secured thereto is significantly reduced.

7 Claims, 8 Drawing Figures

PATENTED APR 17 1973 3,727,312
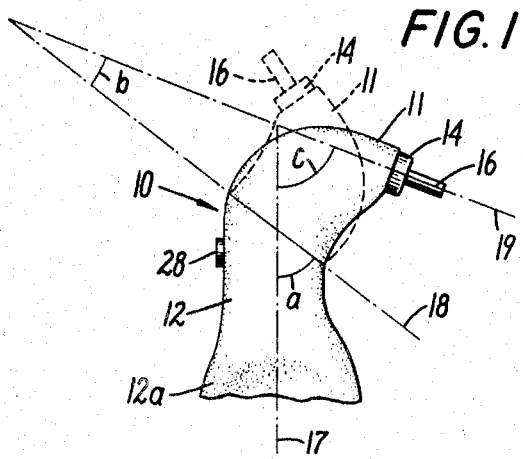
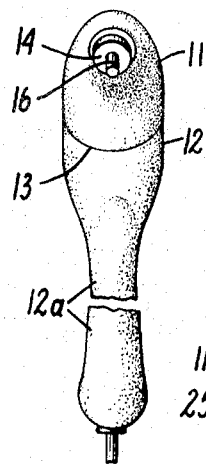
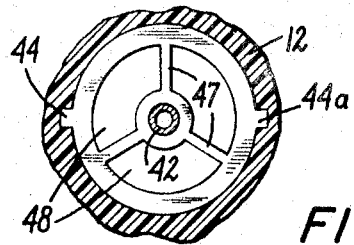
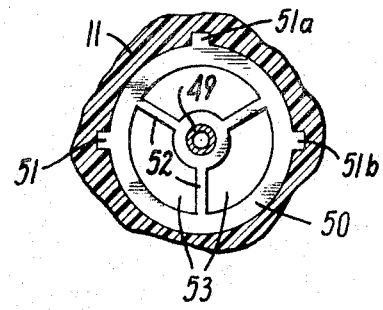
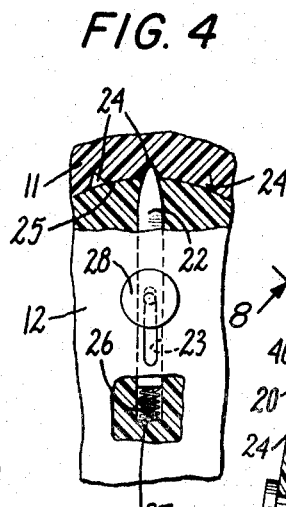
INVENTOR.
JOSEPH L. DURANTE
BY Salvatore C. Mitri
his ATTORNEYS.

DENTAL HAND INSTRUMENT

This invention relates to a new and improved dental hand instrument or the like having a handle or body part and a head rotatably secured to the handle at an angle so that, upon rotation of the head, a dental work peice projecting therefrom can be arcuately displaced and positioned at various angles with respect to said handle, thereby enabling a dentist to readily and easily reach the teeth to be worked upon in a patient's mouth. The dental hand instrument of the invention is further provided with simplified drive means wherein the number of moving parts is significantly reduced.

BACKGROUND OF THE INVENTION

No prior art is known wherein the angle of a dental work piece removably secured to a dental hand instrument can be changed to service the teeth of a patient.

Heretofore, the dental hand instruments have been generally of one piece, rigid construction and the dental work pieces have been secured thereto at a fixed, predetermined angle. Further, the drive means of these dental hand instruments have generally involved complex mechanisms, often including meshing gears, which, due to the environment in which they are operated, have had a tendency to become inoperative due to "freezing" resulting from oxidation of the many moving parts employed.

THE INVENTION

It has now been found that a dental hand instrument can be provided whereby a dental work piece adapted to be removably connected thereto can be arcuately displaced by rotating the head of the dental hand instrument, thereby enabling the dental work piece to be positioned at various angles as desired with respect to the handle of the instrument. The number of moving parts comprising the drive means in the dental hand instrument of the invention has also been substantially reduced, thereby eliminating or significantly minimizing the possibility of having them "freeze" due to oxidation caused by moisture.

In general, the dental hand instrument of the invention comprises an essentially tubular handle or body; a hollow head rotatably secured to said handle at an angle so that a dental work piece projecting from said head can be arcuately displaced upon rotation of said head; and, means to secure said head to said handle in various positions of rotation. In further embodiments, simplified drive means are provided to drive the dental work piece, said means including a flexible shaft or a pneumatically driven blade member.

The dental hand instrument of the invention will be more fully comprehended when considered together with the accompanying drawing wherein the several views illustrate various embodiments thereof and wherein:

FIG. 1 is a fragmentary side elevational view of the dental hand instrument of the invention;

FIG. 2 is a fragmentary front elevational view of the dental hand instrument shown in FIG. 1;

FIG. 3 is a sectional view illustrating one means by which the head can be secured to the handle of the dental hand instrument at various angular positions and also illustrating one type of drive means that can be employed to drive a dental work piece;

FIG. 4 is a fragmentary plan view illustrating in greater detail the lock and securing means shown in FIG. 3;

FIG. 5 is a view taken substantially on the line 5—5 of FIG. 3;

FIG. 6 is a sectional view illustrating another type of drive means which can be employed to drive the dental work piece;

FIG. 7 is a view taken substantially on the line 7—7 of FIG. 6; and,

FIG. 8 is a view taken substantially on the line 8—8 of FIG. 6.

As shown in FIGS. 1 and 2, the dental hand instrument of the invention, generally identified by reference numeral 10, comprises a hollow head 11 rotatably secured to a tubular or hollow handle or body 12 and angularly disposed with respect to the longitudinal axis of the handle 12 as indicated at 13 (FIG. 2). Head 11 is provided with means for detachably securing thereto a face plate 14 which is provided with a bore 15 (FIG. 2) through which a dental work piece 16 can be secured to head 11.

In FIG. 1, the longitudinal axis of handle 12 is shown in dot-dash lines at 17, the plane of rotation of head 11 with respect to handle 12 is indicated by dot-dash line 18, and the axis of the work piece 16 is indicated by dot-dash line 19. With respect to the longitudinal axis 17 of handle 12, therefore, an angle "a" is formed by the intersection of longitudinal axis 17 and the plane of rotation 18, and an angle "c" is similarly formed by the intersection of longitudinal axis 17 and the axis of the dental work piece 19. The intersection of the plane of rotation 18 with the axis of the dental work piece 19 also forms an angle "b."

In order to provide the greatest degree of flexibility and angular displacement of dental work piece 16, angle "a" should be less than about 45° and preferably from about 30° to 40°. Consequently, when head 11 is rotated so that dental work piece 16 is disposed at its lowermost position, as shown in full lines in FIG. 1, angle "b" will be less than the difference between 90° and angle "a" (<90°-angle "a"), thereby permitting dental work piece 16 to be oriented in various positions from one slightly below to one substantially above a perpendicular to the longitudinal axis 17 of handle 12 through an arc of from about 100° to 130°; that is, from a position as shown in full line in FIG. 1 to that of the dotted line position. With respect to the longitudinal axis 17, therefore, angle "c" can be varied from about 60° when the dental work piece is at its lowermost position to one of about 80°.

It will be appreciated, therefore, that angle "c" can be changed from a substantially acute angle to a relatively large obtuse angle to dispose the dental work piece 16 from the solid line position shown in FIG. 1, inclined toward handle 12, to facilitate working on the back surfaces of teeth, to the dotted line position shown in FIG. 1, to facilitate working on tooth surfaces that are difficult to reach, such as molars and wisdom teeth.

Since head 11 is rotatable with respect to handle 12, the cross-section of head 11 and that of handle 12 in the plane of rotation 18 is circular thereby assuring a close fitting relationship therebetween in any position of rotation of head 11. The diameter of handle 12 should, therefore, be equal to the diameter of the plane of rotation 18, but this dimension need not be extended throughout the handle and the remaining portion of handle 12, as indicated at 12a, can be flattened or formed to have an elliptical cross-section as shown in FIGS. 1 and 2.

One means by which head 11 can be rotatably secured to handle 12 is illustrated in FIG. 3 wherein the mating ends of head 11 and handle 12 in the plane of rotation 18 are provided with threads 20 and 21, respectively for head 11 and handle 12. Hence, head 11 is threadably secured to handle 12 and can be rotated by manually turning head 11 to arcuately displace a dental work piece 16.

Upon rotation of head 11 to position a dental work piece 16 at a desired angle, head 11 can be locked in its rotated position by a suitable securing means, one embodiment of which is illustrated in FIGS. 3 and 4. As shown in FIGS. 3 and 4, the securing means comprises a pin 22 seated in a slot 23 formed in the wall of handle 12. Pin 22 is positioned so that its upper end can engage one of a plurality of notches 24 formed in the threaded surface 25 of head 11. The lower end of slot 23 communicates with a recess 26 also formed in the wall of handle 12, recess 26 being in coaxial alignment with a portion of slot 23. Pin 22 is seated in slot 23 so that the lower end of pin 22 extends into recess 26 in which there is carried a spring member 27 biased against the lower end of pin 22 to constantly urge it upward. Pin 22 is manually placed into and out of engagement with notches 24 by means of a button 28 secured to pin 22 and protruding beyond the outer wall of handle 12. By displacing button 28 downwardly against spring member 27, the upper end of pin 22 can be disengaged from one of the notches 24 and head 11 can then be rotated until the dental work piece 16 is at the desired angular position, whereupon the downward pressure upon button 28 is released to permit spring 27 to urge pin 22 upwardly into engagement with a notch 24.

In the embodiment shown in FIG. 3, the face plate 14 is adapted to be removably secured to head 11 by means of internal threads 29 in head 11 and external threads 30 on the shaft 14a of face plate 14. This permits easy access to the interior of head 11 for maintenance and repair of the instrument and/or the drive means that drive dental work piece 16.

One embodiment of a drive means which can be employed is also shown in FIG. 3 and comprises a chuck 31 which can be threadably secured within head 11 in the same manner as face plate 14 and positioned to be in coaxial alignment with bore 15 of face plate 14 thereby permitting a dental work piece 16 to be readily inserted through bore 15 to engage chuck 31. The drive means depicted in FIG. 3 to drive chuck 31 and, consequently, the dental work piece 16, comprises a flexible drive shaft 32, the upper end of which is secured to chuck 31 and which is carried within a flexible drive sleeve 33 through which a lubricant can be supplied to the flexible drive shaft 32. The other end of flexible drive shaft 32 (not shown) is adapted to be connected by conventional means known to those skilled in the art to a suitable source of power. The flexible drive shaft 32 and flexible drive sleeve 33 are retained in position within the instrument throughout any rotation of head 11 by a positioning means, generally identified by reference numeral 34, supported within head 11 and retained in close fitting contact therein by means of lock washer 34a.

As shown more clearly in FIG. 5, positioning means 34 comprises a disc having a plurality of radial spokes 36 extending inwardly therefrom. Spokes 36 carry a universal joint 37 and flexible drive shaft 32 and flexible drive sleeve 33 are rotatably supported by the split ball 38 of universal joint 37. The spaced radial spokes 36 provide passages 39 therebetween through which other conduits can be provided for conveying such materials as water for spraying, lubricants, and the like, as is well known to those skilled in the art.

Positioning means 34 is supported within the dental hand instrument in the plane of rotation 13, by seating it and lock washer 34a upon a portion of the upper end of handle 12 and securing them thereon through engagement with a shoulder 40 formed by groove 41 in the inner wall of head 11 as shown in FIG. 3.

In FIGS. 6–8, another embodiment of a drive means which can be employed to drive a dental work piece 16 is illustrated. In this embodiment, the drive means is pneumatically driven and comprises a lower pneumatic conduit 42 carried within handle 12 and through which air under pressure is supplied through its lower end (not shown) from a suitable supply source of air under pressure. Lower pneumatic conduit 42 is secured to handle 12 by a disc 43 (FIG. 7) having a pair of diametrically opposed tounges 44, 44a which are seated upon the shoulder 45 of a groove 46 formed at the upper end of handle 12. Extending inwardly from disc 43 are a plurality of radial spoke members 47 to which the upper end of conduit 42 is secured, thereby forming a plurality of ports 48 between the spoke members 47. In similar fashion, an upper conduit 49 is supported within head 11 by a disc means 50 (FIG. 8) having a plurality of tounges 51, 51a and 51b which are seated in the groove 41 of head 11 against shoulder 40. Disc means 50 also has a plurality of inwardly extending radial spokes 52 to which upper pneumatic conduit 49 is secured, thereby also forming a plurality of ports 53 therebetween. In assembly, the bore of lower pneumatic conduit 42 is positioned to communicate with that of the upper pneumatic conduit 49 with ports 48 mating with ports 53 so that other conduit means can be provided through these ports and, more importantly, provide the means to exhaust air out of the instrument.

The upper extremity of upper conduit 49 (FIG. 6) is contoured to impinge air upon a pneumatic blade 54, such as a turbine blade, which is fixedly secured to chuck 31 by means of shaft 55. Hence, air under pressure supplied through pneumatic conduits 42 and 49 is impinged upon pneumatic blade 54 causing it to rotate, thereby also rotating chuck 31 through shaft 55 to drive a dental work piece secured to chuck 31.

While the threaded portions of the dental hand instrument of the invention can be pipe threads, it is preferred that they be machine threads in order to provide a close fitting relationship between all threaded parts and thereby prevent moisture or other foreign materials from entering into the body of the instrument.

Although the rotatable featuers of the head with respect to the body of the dental hand instrument have been described with particular relation to driving a dental work piece, it should be understood that this has been by way of illustration and that these concepts are equally applicable to other dental work pieces which are not driven, such as dental mirrors, picks, and the like. Hence, it will be apparent to those skilled in the art and those practicing the invention that various changes, modifications and alterations can be made in the dental hand instrument described herein without departing from the scope and spirit of the invention.

What is claimed is:

1. A dental hand instrument comprising a tubular handle; a hollow head rotatably secured to the upper end of said handle and disposed at an angle with respect to the longitudinal axis of said handle, said head being rotatably secured to said handle by means of mating screw threads in said head and said handle; locking and securing means communicating with said head and said handle to lock and secure said head to said handle through engagement of said locking and securing means with said head in various positions of rotation of said head, said locking and securing means comprising a plurality of spaced notches formed in the threaded portion of said head, a vertical pin means seated in a slot formed in the wall of said handle and positioned such that the upper end of said pin means is in alignment to engage said notches, spring means seated in a recess formed at the lower end of said slot and engaging the lower end of said pin means such that said pin means is constantly urged upwardly by said pin means, said recess communicating with said slot, means secured intermediate the ends of said pin means and extending beyond the outer surface of said handle for manually urging said pin means into and out of engagement with said notches; and, means for mounting a dental work piece to said head.

2. A dental hand instrument as defined in claim 1 wherein the angle at which said head is disposed with respect to the longitudinal axis of said handle is less than about 45° and the angle formed by the intersection of the longitudinal axis of said handle and the axis of a dental work piece mounted to said head when said head has been rotated to its lowermost position is less than the difference between 90° and the angular disposition of said head.

3. A dental hand instrument as defined in claim 2 wherein the angle at which said head is disposed is from about 30° to 40°.

4. A dental hand instrument as defined in claim 1 wherein the means for mounting a dental workpiece to said head includes a chuck detachably secured within said head; a face plate having a bore axially formed therein and detachably secured to the front end of said head such that said bore is in alignment with said chuck; means extending within said dental hand instrument adapted to drive said dental workpiece mounted to said head, said drive means comprising a flexible drive shaft carried within a flexible drive sleeve, the upper end of said flexible drive shaft being secured to said chuck and the other end of said flexible drive shaft adapted to be connected to a source of power; and, means for supporting said flexible drive shaft and said flexible drive sleeve within said dental hand instrument throughout all positions of rotation of said head.

5. A dental hand instrument as defined in claim 4 wherein said support means comprises a disc having a plurality of spaced radial spokes extending inwardly therefrom, said disc being secured within said dental hand instrument in the plane of rotation of said head, the innermost ends of said radial spokes being secured to a universal joint having a split ball in which said flexible drive shaft and said flexible drive sleeve are rotatably secured.

6. A dental hand instrument as defined in claim 4 wherein the means to drive said dental work piece comprises a pneumatic blade member secured to the innermost side of said chuck; an upper pneumatic conduit supported within said dental instrument, the upper end of said upper pneumatic conduit being positioned such that air under pressure conveyed therethrough is impinged upon said pneumatic blade member; and, a lower pneumatic conduit supported within said dental hand instrument and positioned therein such that its bore communicates with the bore of said upper pneumatic conduit, the lower end of said lower pneumatic conduit being adapted to communicate with a source supply of air under pressure.

7. A dental hand instrument as defined in claim 6 wherein the means to support said upper and lower pneumatic conduits comprises a pair of discs, one of which secures the lower end of said upper pneumatic conduit and the other of which secures the upper end of said lower pneumatic conduit in the plane of rotation of said head such that the bores of said upper and lower pneumatic conduits communicate with each other throughout all positions of rotation of said head, each of said discs having a plurality of spaced radial spokes extending inwardly therefrom, the inner ends of said spokes in one disc being secured to the lower end of said upper pneumatic conduit and the inner ends of said spokes on the other disc being secured to the upper end of said lower pneumatic conduit, the spaces formed between the spokes in each of said discs providing ports through which air can be exhausted from said dental hand instrument.

* * * * *